(12) United States Patent
Zhao

(10) Patent No.: US 11,487,086 B2
(45) Date of Patent: Nov. 1, 2022

(54) CAMERA OPTICAL LENS INCLUDING EIGHT LENSES OF +−+−+−+− OR +−+−−−+− REFRACTIVE POWERS

(71) Applicant: AAC Optics Solutions Pte. Ltd., Singapore (SG)

(72) Inventor: Qing Zhao, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 339 days.

(21) Appl. No.: 16/835,252

(22) Filed: Mar. 30, 2020

(65) Prior Publication Data

US 2021/0181471 A1 Jun. 17, 2021

(30) Foreign Application Priority Data

Dec. 13, 2019 (CN) .......................... 201911285664.6

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2019/0204560 A1* 7/2019 Jhang ........................ G02B 9/64

* cited by examiner

*Primary Examiner* — Wen Huang
(74) *Attorney, Agent, or Firm* — W&G Law Group

(57) ABSTRACT

The present disclosure relates to the field of optical lenses and provides a camera optical lens. The camera optical lens includes, from an object side to an image side: a first lens; a second lens; a third lens; a fourth lens; a fifth lens; a sixth lens; a seventh lens; and an eighth lens. The camera optical lens satisfies following conditions: $1.90 \leq f1/f \leq 3.00$; $f2 \leq 0.00$; and $1.55 \leq n3 \leq 1.70$, where f denotes a focal length of the camera optical lens; f1 denotes a focal length of the first lens; f2 denotes a focal length of the second lens; and n3 denotes a refractive index of the third lens. The present disclosure can achieve high optical performance while achieving ultra-thin, wide-angle lenses having a big aperture.

9 Claims, 7 Drawing Sheets

CAMERA OPTICAL LENS INCLUDING EIGHT LENSES OF +−+−+−+− OR +−+−−−+− REFRACTIVE POWERS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure, or even a five-piece or six-piece structure. Also, with the development of technology and the increase of the diverse demands of users, and as the pixel area of photosensitive devices is becoming smaller and smaller and the requirement of the system on the imaging quality is improving constantly, an eight-piece lens structure gradually appears in lens designs. Although the common eight-piece lens has good optical performance, its settings on refractive power, lens spacing and lens shape still have some irrationality, which results in that the lens structure cannot achieve a high optical performance while satisfying design requirements for ultra-thin, wide-angle lenses having a big aperture.

SUMMARY

In view of the problems, the present disclosure aims to provide a camera lens, which can achieve a high optical performance while satisfying design requirements for ultra-thin, wide-angle lenses having a big aperture.

In an embodiment, the present disclosure provides a camera optical lens. The camera optical lens includes, from an object side to an image side: a first lens; a second lens; a third lens; a fourth lens; a fifth lens; a sixth lens; a seventh lens; and an eighth lens. The camera optical lens satisfies following conditions: $1.90 \leq f1/f \leq 3.00$; $f2 \leq 0.00$; and $1.55 \leq n3 \leq 1.70$, where f denotes a focal length of the camera optical lens; f1 denotes a focal length of the first lens; f2 denotes a focal length of the second lens; and n3 denotes a refractive index of the third lens.

The present disclosure can achieve ultra-thin, wide-angle lenses having good optical characteristics and a big aperture, which are especially suitable for camera lens assembly of mobile phones and WEB camera lenses formed by CCD, CMOS and other imaging elements for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
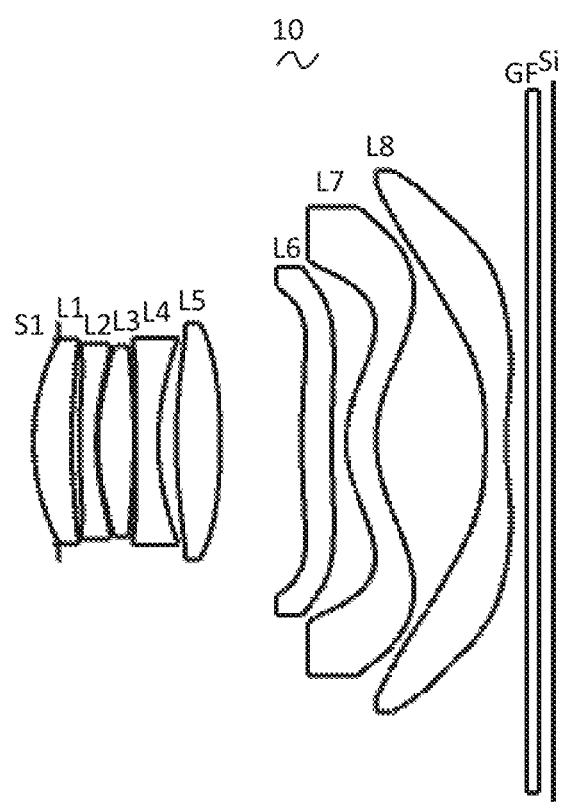
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 8 lenses. Specifically, the camera optical lens 10 includes, from an object side to an image side, an aperture S, a first lens L1, a second lens L2, a third lens L3, a fourth lens L4, a fifth lens L5, a sixth lens L6, a seventh lens L7, and an eighth lens L8. An optical element such as a glass filter (GF) can be arranged between the eighth lens L8 and an image plane Si.

Here, a focal length of the camera optical lens 10 is defined as f, and a focal length of the first lens L1 is defined as f1. The camera optical lens 10 should satisfy a condition of $1.90 \leq f1/f \leq 3.00$, which specifies a ratio between the focal length of the first lens and the focal length of the camera optical lens. When the condition is satisfied, a spherical aberration and the field curvature of the system can be effectively balanced.

A focal length of the second lens L2 is defined as f2, which satisfies a condition of $f2 \leq 0.00$. This condition specifies a negative value for the focal length of the second lens. This leads to the more appropriate distribution of the focal length, thereby achieving a better imaging quality and a lower sensitivity.

A refractive index of the third lens L3 is defined as n3, which satisfies a condition of $1.55 \le n3 \le 3.70$. This condition specifies the refractive index of the third lens L3. This facilitates improving the optical performance of the system.

A curvature radius of an object side surface of the seventh lens L7 is defined as R13, and a curvature radius of an image side surface of the seventh lens L7 is defined as R14. The camera optical lens 10 should satisfy a condition of $-7.00 \le (R13+R14)/(R13-R14) \le -2.00$, which specifies a shape of the seventh lens L7. This condition can alleviate the deflection of light passing through the lens while effectively reducing aberrations.

An on-axis thickness of the third lens L3 is defined as d5, and an on-axis distance from an image side surface of the third lens L3 to an object side surface of the fourth lens L4 is defined as d6. The camera optical lens 10 should satisfy a condition of $5.00 \le d5/d6 \le 22.00$. This condition specifies a ratio of the thickness of the third lens L3 and the on-axis distance from the image side surface of the third lens L3 to the object side surface of the fourth lens L4. This facilitates reducing a total length of the optical system while achieving the ultra-thin effect. As an example, $5.16 \le d5/d6 \le 21.88$.

A curvature radius of an object side surface of the first lens L1 is defined as R1, and a curvature radius of an image side surface of the first lens L1 is defined as R2. The camera optical lens 10 should satisfy a condition of $-15.47 \le (R1+R2)/(R1-R2) \le -2.06$. This condition can reasonably control a shape of the first lens in such a manner that the first lens can effectively correct spherical aberrations of the system. As an example, $-9.67 \le (R1+R2)/(R1-R2) \le -2.57$.

An on-axis thickness of the first lens L1 is defined as d1, and a total optical length from the object side surface of the first lens L1 to an image plane of the camera optical lens along an optic axis is defined as TTL. The camera optical lens 10 should satisfy a condition of $0.03 \le d1/TTL \le 0.11$. This condition can facilitate achieving ultra-thin lenses. As an example, $0.04 \le d1/TTL \le 0.09$.

The focal length of the camera optical lens 10 is defined as f, and the focal length of the second lens L2 is defined as f2. The camera optical lens 10 should satisfy a condition of $-25.25 \le f2/f \le -1.32$. This condition can facilitate correction aberrations of the optical system by controlling a negative refractive power of the second lens L2 within a reasonable range. As an example, $-15.78 \le f2/f \le -1.65$.

A curvature radius of an object side surface of the second lens L2 is defined as R3, and a curvature radius of an image side surface of the second lens L2 is defined as R4. The camera optical lens 10 should satisfy a condition of $1.37 \le (R3+R4)/(R3-R4) \le 23.22$, which specifies a shape of the second lens L2. This can facilitate correction of an off-axis aberration with development towards ultra-thin lenses. As an example, $2.20 \le (R3+R4)/(R3-R4) \le 18.58$.

An on-axis thickness of the second lens L2 is defined as d3. The camera optical lens 10 should satisfy a condition of $0.02 \le d3/TTL \le 0.05$. This condition can facilitate achieving ultra-thin lenses. As an example, $0.02 \le d3/TTL \le 0.04$.

The focal length of the camera optical lens 10 is defined as f, and the focal length of the third lens L3 is defined as f3. The camera optical lens 10 should satisfy a condition of $0.33 \le f3/f \le 1.41$. This condition can lead to the more appropriate distribution of the refractive power, thereby achieving a better imaging quality and a lower sensitivity. As an example, $0.52 \le f3/f \le 1.13$.

A curvature radius of an object side surface of the third lens L3 is defined as R5, and a curvature radius of an image side surface of the third lens L3 is defined as R6. The camera optical lens 10 should satisfy a condition of $-0.53 \le (R5+R6)/(R5-R6) \le -0.05$, which specifies a shape of the third lens. This condition can alleviate the deflection of light passing through the lens while effectively reducing aberrations. As an example, $-0.33 \le (R5+R6)/(R5-R6) \le -0.06$.

An on-axis thickness of the third lens L3 is defined as d5. The camera optical lens 10 should satisfy a condition of $0.03 \le d5/TTL \le 0.13$. This condition can facilitate achieving ultra-thin lenses. As an example, $0.06 \le d5/TTL \le 0.10$.

The focal length of the camera optical lens 10 is defined as f, and the focal length of the fourth lens L4 is defined as f4. The camera optical lens 10 should satisfy a condition of $-3.81 \le f4/f \le -0.49$, which specifies a ratio of the focal length of the fourth lens and the focal length of the camera optical lens. This condition can facilitate improving the optical performance of the system. As an example, $-2.38 \le f4/f \le -0.61$.

A curvature radius of an object side surface of the fourth lens L4 is defined as R7, and a curvature radius of an image side surface of the fourth lens L4 is defined as R8. The camera optical lens 10 should satisfy a condition of $0.32 \le (R7+R8)/(R7-R8) \le 3.53$, which specifies a shape of the fourth lens L4. This can facilitate correction of an off-axis aberration with development towards ultra-thin lenses. As an example, $0.51 \le (R7+R8)/(R7-R8) \le 2.83$.

An on-axis thickness of the fourth lens L4 is defined as d7. The camera optical lens 10 should satisfy a condition of $0.02 \le d7/TTL \le 0.07$. This condition can facilitate achieving ultra-thin lenses. As an example, $0.03 \le d7/TTL \le 0.06$.

The focal length of the camera optical lens 10 is defined as f, and the focal length of the fifth lens L5 is defined as f5. The camera optical lens 10 should satisfy a condition of $-45.83 \le f5/f \le 157.32$. This condition can effectively make a light angle of the camera lens gentle and reduce the tolerance sensitivity. As an example, $-28.65 \le f5/f \le 125.85$.

A curvature radius of an object side surface of the fifth lens L5 is defined as R9, and a curvature radius of an image side surface of the fifth lens L5 is defined as R10. The camera optical lens 10 should satisfy a condition of $-140.64 \le (R9+R10)/(R9-R10) \le 13.50$, which specifies a shape of the fifth lens L5. This can facilitate correction of an off-axis aberration with development towards ultra-thin lenses. As an example, $-87.90 \le (R9+R10)/(R9-R10) \le 10.80$.

An on-axis thickness of the fifth lens L5 is defined as d9. The camera optical lens 10 should satisfy a condition of $0.02 \le d9/TTL \le 0.13$. This condition can facilitate achieving ultra-thin lenses. As an example, $0.03 \le d9/TTL \le 0.10$.

The focal length of the camera optical lens 10 is defined as f, and the focal length of the sixth lens L6 is defined as f6. The camera optical lens 10 should satisfy a condition of $-21.08 \le f6/f0 \le -1.00$. This condition can lead to the more appropriate distribution of the refractive power, thereby achieving a better imaging quality and a lower sensitivity. As an example, $-13.17 \le f6/f \le -1.25$.

A curvature radius of an object side surface of the sixth lens L6 is defined as R11, and a curvature radius of an image side surface of the sixth lens L6 is defined as R12. The camera optical lens 10 should satisfy a condition of $1.04 \le (R11+R12)/(R11-R12) \le 11.70$, which specifies a shape of the sixth lens L6. This can facilitate correction of an off-axis aberration with development towards ultra-thin lenses. As an example, $1.66 \le (R11+R12)/(R11-R12) \le 9.36$.

An on-axis thickness of the sixth lens L6 is defined as d1. The camera optical lens 10 should satisfy a condition of $0.03 \leq d11/TTL \leq 0.10$. This condition can facilitate achieving ultra-thin lenses. As an example, $0.05 \leq d11/TTL \leq 0.08$.

The focal length of the camera optical lens 10 is defined as f, and the focal length of the seventh lens L7 is defined as f7. The camera optical lens 10 should satisfy a condition of $0.38 \leq f7/f \leq 2.48$. This condition can lead to the more appropriate distribution of the refractive power, thereby achieving a better imaging quality and a lower sensitivity. As an example, $0.61 \leq f7/f \leq 1.98$.

An on-axis thickness of the seventh lens L7 is defined as d13. The camera optical lens 10 should satisfy a condition of $0.03 \leq d13/TTL \leq 0.12$. This condition can facilitate achieving ultra-thin lenses. As an example, $0.05 \leq d13/TTL \leq 0.10$.

The focal length of the camera optical lens 10 is defined as f, and the focal length of the eighth lens L8 is defined as f8. The camera optical lens 10 should satisfy a condition of $-1.80 \leq f8/f \leq -0.53$. This condition can lead to the more appropriate distribution of the refractive power, thereby achieving a better imaging quality and a lower sensitivity. As an example, $-1.13 \leq f8/f \leq -0.67$.

A curvature radius of an object side surface of the eighth lens L8 is defined as R15, and a curvature radius of an image side surface of the eighth lens L8 is defined as R16. The camera optical lens 10 should satisfy a condition of $-1.18 \leq (R15+R16)/(R15-R16) \leq 0.87$, which specifies a shape of the eighth lens L8. This can facilitate correction of an off-axis aberration with development towards ultra-thin lenses. As an example, $-0.74 \leq (R15+R16)/(R15-R16) \leq 0.70$.

An on-axis thickness of the eighth lens L8 is defined as d15. The camera optical lens 10 should satisfy a condition of $0.02 \leq d15/TTL \leq 0.09$. This condition can facilitate achieving ultra-thin lenses. As an example, $0.03 \leq d15/TTL \leq 0.07$.

In this embodiment, an image height of the camera optical lens 10 is defined as IH. The camera optical lens 10 should satisfy a condition of $TTL/IH \leq 1.48$. This condition can facilitate achieving ultra-thin lenses.

In this embodiment, an F number of the camera optical lens 10 is smaller than or equal to 1.96, thereby leading to a big aperture and high imaging performance.

In this embodiment, a FOV (field of view) of the camera optical lens 10 is greater than or equal to 78°, thereby achieving the wide-angle performance.

When the focal length of the camera optical lens 10, the focal lengths of respective lenses, the refractive index of the seventh lens, the on-axis thicknesses of respective lenses, the TTL, and the curvature radius of object side surfaces and image side surfaces of respective lenses satisfy the above conditions, the camera optical lens 10 will have high optical performance while achieving ultra-thin, wide-angle lenses having a big aperture. The camera optical lens 10 is especially suitable for camera lens assembly of mobile phones and WEB camera lenses formed by CCD, CMOS and other imaging elements for high pixels.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image plane of the camera optical lens along the optic axis) in mm.

In an example, inflexion points and/or arrest points can be arranged on the object side surface and/or image side surface of the lens, so as to satisfy the demand for the high quality imaging. The description below can be referred to for specific implementations.

Table 1 and Table 2 show design data of the camera optical lens 10 according to Embodiment 1 of the present disclosure.

TABLE 1

|     | R       | d      |     | nd     |     | vd    |
| --- | ------- | ------ | --- | ------ | --- | ----- |
| S1  | ∞       | d0 = −0.449 |     |        |     |       |
| R1  | 4.004   | d1 = 0.667 | nd1 | 1.5450 | v1  | 55.81 |
| R2  | 7.844   | d2 = 0.149 |     |        |     |       |
| R3  | 11.203  | d3 = 0.289 | nd2 | 1.6701 | v2  | 19.39 |
| R4  | 5.220   | d4 = 0.030 |     |        |     |       |
| R5  | 5.106   | d5 = 0.637 | nd3 | 1.6701 | v3  | 19.39 |
| R6  | −8.741  | d6 = 0.032 |     |        |     |       |
| R7  | −20.454 | d7 = 0.390 | nd4 | 1.6701 | v4  | 19.39 |
| R8  | 4.489   | d8 = 0.320 |     |        |     |       |
| R9  | 9.765   | d9 = 0.769 | nd5 | 1.5450 | v5  | 55.81 |
| R10 | −12.979 | d10 = 1.440 |     |        |     |       |
| R11 | 18.436  | d11 = 0.519 | nd6 | 1.6359 | v6  | 23.82 |
| R12 | 8.815   | d12 = 0.259 |     |        |     |       |
| R13 | 2.178   | d13 = 0.533 | nd7 | 1.5510 | v7  | 45.00 |
| R14 | 2.929   | d14 = 1.919 |     |        |     |       |
| R15 | −17.601 | d15 = 0.360 | nd8 | 1.5450 | v8  | 55.81 |
| R16 | 4.639   | d16 = 0.375 |     |        |     |       |
| R17 | ∞       | d17 = 0.210 | ndg | 1.5168 | vg  | 64.17 |
| R18 | ∞       | d18 = 0.246 |     |        |     |       |

In the table, meanings of various symbols will be described as follows.

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of the object side surface of the seventh lens L7;

R14: curvature radius of the image side surface of the seventh lens L7;

R15: curvature radius of the object side surface of the eighth lens L8;

R16: curvature radius of the image side surface of the eighth lens L8;

R17: curvature radius of an object side surface of the optical filter GF;

R18: curvature radius of an image side surface of the optical filter GF;

d: on-axis thickness of a lens and an on-axis distance between lenses;

d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;

v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −4.9686E−01 | −2.5446E−03 | −1.8484E−03 | 3.2024E−03 | −2.9385E−03 | 1.7312E−03 | −6.4761E−04 | 1.5173E−04 | −2.0254E−05 | 1.1854E−06 |
| R2 | −3.8994E+00 | −1.9798E−02 | 4.1619E−03 | −9.6689E−05 | 1.9375E−04 | −5.4504E−04 | 4.2872E−04 | −1.5476E−04 | 2.6958E−05 | −1.8113E−06 |
| R3 | 1.5927E+01 | −1.6301E−02 | 3.7805E−03 | −1.2384E−03 | −1.4056E−03 | 1.5117E−03 | −6.0350E−04 | 1.1276E−04 | −7.9907E−06 | −4.9431E−08 |
| R4 | −1.5890E+01 | 8.9999E−03 | 1.5556E−02 | −2.3569E−02 | 1.6884E−02 | −8.0393E−03 | 2.3097E−03 | −3.3540E−04 | 1.4132E−05 | 9.2020E−07 |
| R5 | 4.1285E+00 | −1.4995E−02 | 2.0745E−02 | −2.7154E−02 | 2.3625E−02 | −1.3676E−02 | 4.9248E−03 | −1.0471E−03 | 1.2030E−04 | −5.7888E−06 |
| R6 | −9.9100E+01 | 3.5801E−02 | −4.9657E−02 | 3.9441E−02 | −2.2640E−02 | 9.4637E−03 | −2.7465E−03 | 5.1484E−04 | −5.5072E−05 | 2.5158E−06 |
| R7 | −8.8960E+01 | 5.5068E−02 | −6.3335E−02 | 4.6726E−02 | −2.6437E−02 | 1.0601E−02 | −2.8192E−03 | 4.6150E−04 | −4.0028E−05 | 1.2483E−06 |
| R8 | −7.7052E−01 | −7.1368E−03 | 1.1776E−03 | −7.8491E−04 | 2.3904E−04 | −1.5293E−05 | 5.3075E−06 | −3.2819E−06 | 6.4796E−07 | −4.3213E−08 |
| R9 | −6.4585E+01 | 1.5813E−03 | 8.6901E−04 | −1.0532E−03 | 6.3911E−04 | −2.4917E−04 | 5.5508E−05 | −6.6845E−06 | 4.0448E−07 | −9.7303E−09 |
| R10 | 2.7176E+01 | −5.0921E−03 | 2.4360E−03 | 2.3002E−04 | −2.3957E−04 | 1.1225E−04 | −2.8114E−05 | 3.4505E−06 | −1.4800E−07 | −1.6964E−09 |
| R11 | −9.9000E+01 | 1.9849E−03 | −2.0738E−03 | 1.0133E−03 | −4.4881E−04 | 1.3260E−04 | −2.7438E−05 | 3.5918E−06 | −2.6221E−07 | 8.0731E−09 |
| R12 | −9.8422E+01 | −1.6304E−02 | 6.0073E−03 | −1.7428E−03 | 4.0095E−04 | −7.2842E−05 | 8.5041E−06 | −5.6955E−07 | 1.9341E−08 | −2.3359E−10 |
| R13 | −5.3073E+00 | 1.5429E−02 | −1.0443E−02 | 2.4186E−03 | −4.8481E−04 | 8.7199E−05 | −1.2017E−05 | 1.0639E−06 | −5.3249E−08 | 1.1615E−09 |
| R14 | −6.6690E−01 | 5.7729E−03 | −9.5412E−03 | 2.1332E−03 | −2.7396E−04 | 2.1755E−05 | −1.0589E−06 | 2.9165E−08 | −3.6329E−10 | 6.5957E−13 |
| R15 | 1.1164E+01 | −4.2551E−02 | 8.3807E−03 | −6.3831E−04 | −8.5514E−06 | 5.1186E−06 | −3.9110E−07 | 1.4310E−08 | −2.6341E−10 | 1.9540E−12 |
| R16 | −2.1624E+01 | −2.3705E−02 | 3.7888E−03 | −4.2435E−04 | 4.6626E−05 | −4.8103E−06 | 3.2855E−07 | −1.2809E−08 | 2.5923E−10 | −2.1187E−12 | d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the optical filter GF;
d17: on-axis thickness of the optical filter GF;
d18: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
nd8: refractive index of d line of the eighth lens L8;
ndg: refractive index of d line of the optical filter GF;
vd: abbe number;
v1: abbe number of the first lens L1;
v2: abbe number of the second lens L2;

In Table 2, k is a conic coefficient, and A4, A6, A8, A10, A12, A14, A16, A18 and A20 are aspheric surface coefficients.

IH. Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

In the present embodiment, an aspheric surface of each lens surface uses the aspheric surfaces shown in the above condition (1). However, the present disclosure is not limited to the aspherical polynomials form shown in the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively, P2R1 and P2R2 represent the object side surface and the image side surface of the second lens L2, respectively, P3R1 and P3R2 represent the object side surface and the image side surface of the third lens L3, respectively, P4R1 and P4R2 represent the object side surface and the image side surface of the fourth lens L4, respectively, P5R1 and P5R2 represent the object side surface and the image side surface of the fifth lens L5, respectively, P6R1 and P6R2 represent the object side surface and the image side surface of the sixth lens L6, respectively, P7R1 and P7R2 represent the object side surface and the image side surface of the seventh lens L7, respectively, and P8R1 and P8R2 represent the object side surface and the image side surface of the eighth lens L8, respectively. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 0 | | | |
| P1R2 | 2 | 0.945 | 1.215 | |
| P2R1 | 1 | 0.805 | | |
| P2R2 | 1 | 1.235 | | |
| P3R1 | 0 | | | |
| P3R2 | 1 | 1.635 | | |
| P4R1 | 3 | 0.315 | 0.845 | 1.745 |
| P4R2 | 0 | | | |
| P5R1 | 2 | 1.635 | 1.975 | |
| P5R2 | 0 | | | |
| P6R1 | 1 | 1.255 | | |
| P6R2 | 2 | 0.675 | 3.035 | |
| P7R1 | 2 | 1.235 | 3.205 | |
| P7R2 | 2 | 1.455 | 4.175 | |
| P8R1 | 1 | 3.435 | | |
| P8R2 | 1 | 0.715 | | |

TABLE 4

| | Number of arrest points | Arrest point position 1 | Arrest point position 2 |
|---|---|---|---|
| P1R1 | 0 | | |
| P1R2 | 0 | | |
| P2R1 | 1 | 1.365 | |
| P2R2 | 0 | | |
| P3R1 | 0 | | |
| P3R2 | 0 | | |
| P4R1 | 2 | 0.655 | 0.995 |
| P4R2 | 0 | | |
| P5R1 | 0 | | |
| P5R2 | 0 | | |
| P6R1 | 1 | 1.825 | |
| P6R2 | 1 | 1.505 | |
| P7R1 | 1 | 2.155 | |
| P7R2 | 1 | 2.765 | |
| P8R1 | 0 | | |
| P8R2 | 1 | 1.455 | |

Figure 2:
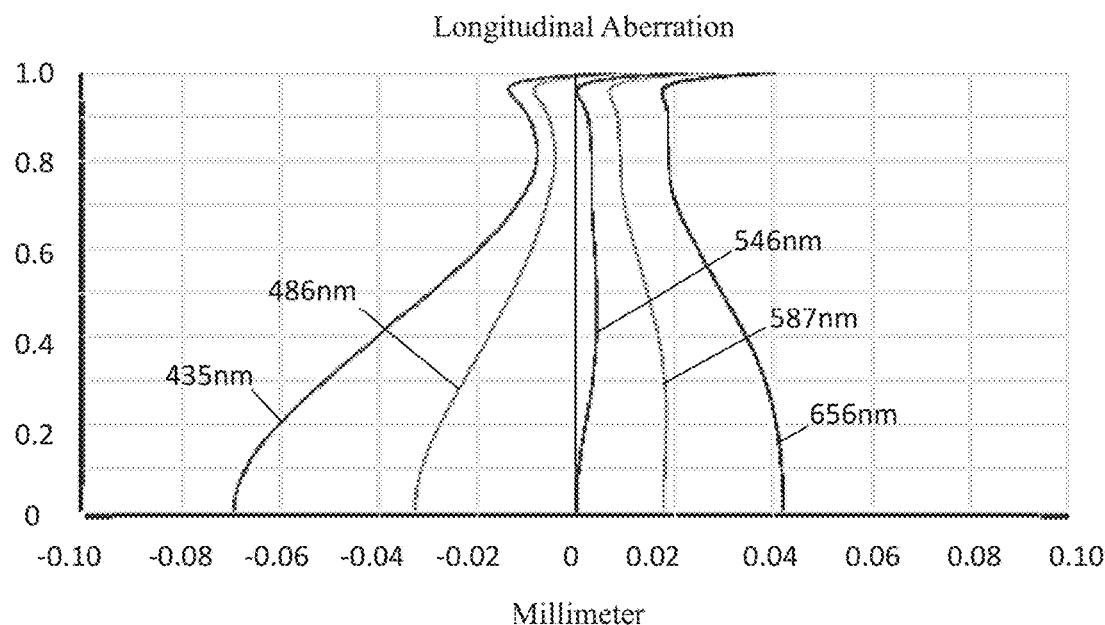
FIG. 2 is a schematic diagram of a longitudinal aberration of the camera optical lens shown in FIG. 1.
Figure 3:
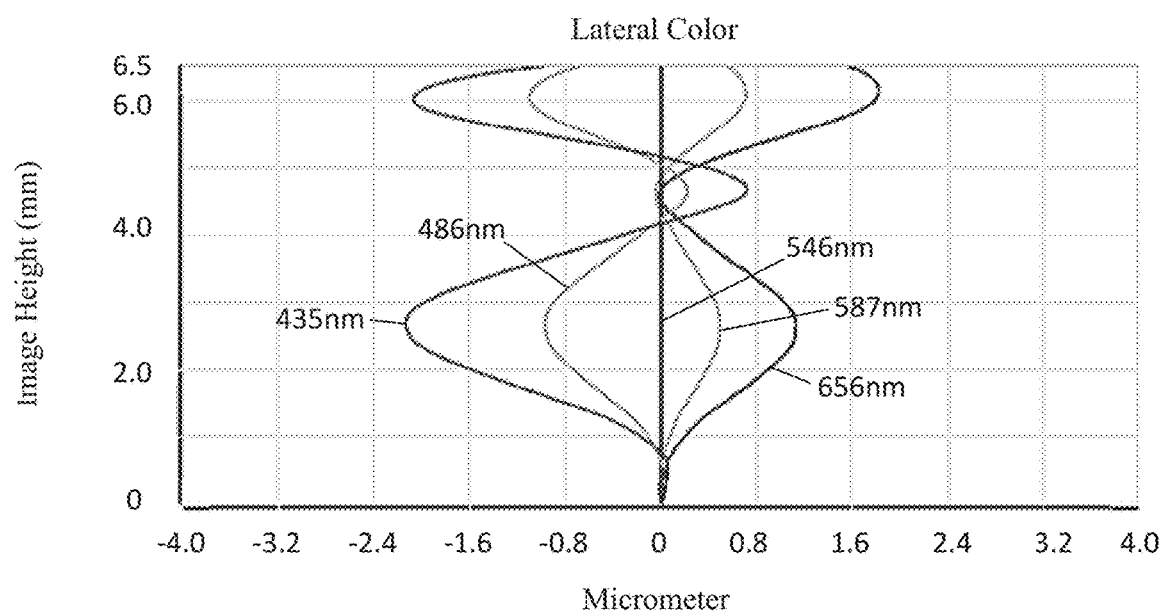
FIG. 3 is a schematic diagram of a lateral color of the camera optical lens shown in FIG. 1.
Figure 4:
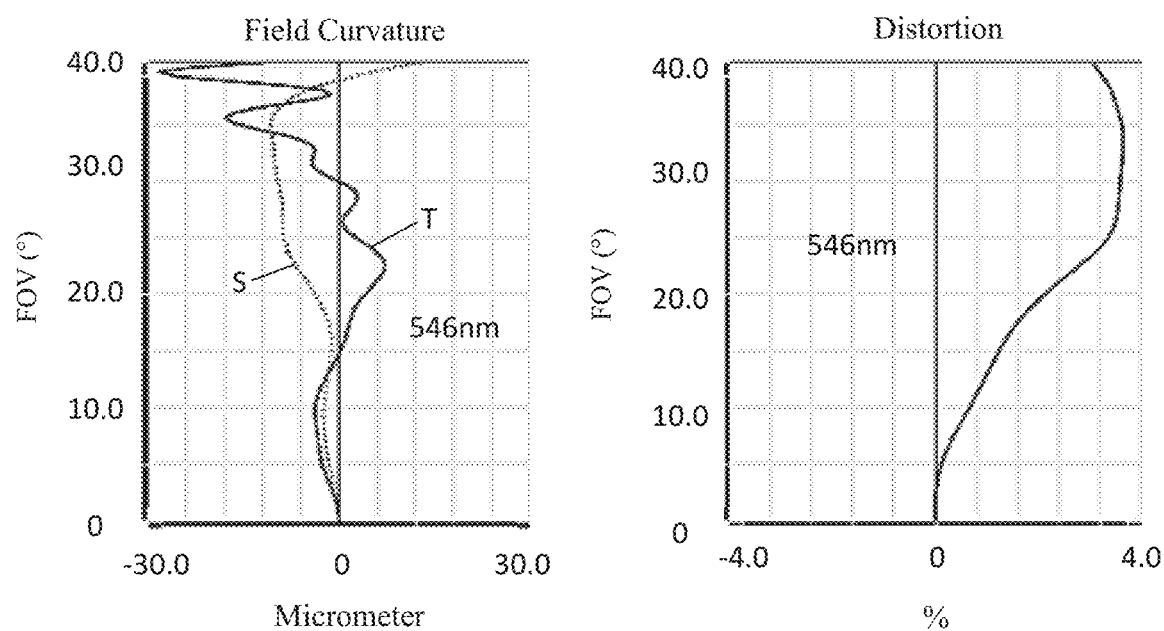
FIG. 4 is a schematic diagram of a field curvature and a distortion of the camera optical lens shown in FIG. 1.
Figure 5:
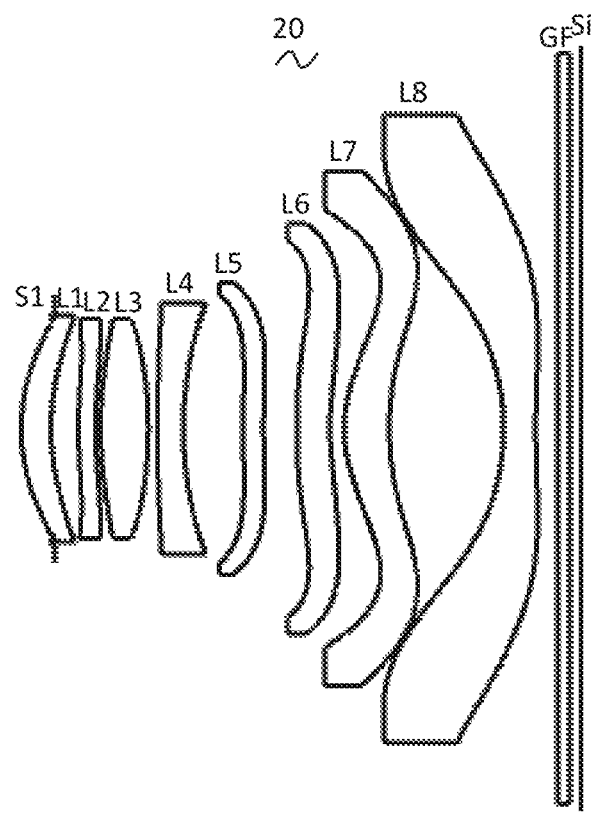
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 656 nm, 587 nm, 546 nm, 486 nm and 435 nm after passing the camera optical lens 10 according to Embodiment 1. FIG. 4 illustrates a field curvature and a distortion of light with a wavelength of 546 nm after passing the camera optical lens 10 according to Embodiment 1, in which a field curvature S is a field curvature in a sagittal direction and T is a field curvature in a tangential direction.

Table 13 below further lists various values of Embodiments 1, 2, and 3 and values corresponding to parameters which are specified in the above conditions.

As shown in Table 13, Embodiment 1 satisfies respective conditions.

In this embodiment, the entrance pupil diameter of the camera optical lens is 3.797 mm. The image height of 1.0H is 6.50 mm. The FOV (field of view) is 80.00°. Thus, the camera optical lens can achieve ultra-thin, wide-angle lenses while having on-axis and off-axis aberrations sufficiently corrected, thereby leading to better optical characteristics.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0 = | −0.580 | | | | |
| R1 | 3.358 | d1 = | 0.512 | nd1 | 1.5450 | v1 | 55.81 |
| R2 | 4.355 | d2 = | 0.467 | | | | |
| R3 | 8.125 | d3 = | 0.289 | nd2 | 1.6701 | v2 | 19.39 |
| R4 | 7.139 | d4 = | 0.091 | | | | |
| R5 | 7.416 | d5 = | 0.814 | nd3 | 1.5510 | v3 | 45.00 |
| R6 | −8.628 | d6 = | 0.153 | | | | |
| R7 | 19.881 | d7 = | 0.447 | nd4 | 1.6701 | v4 | 19.39 |
| R8 | 6.626 | d8 = | 1.025 | | | | |
| R9 | 28.648 | d9 = | 0.344 | nd5 | 1.6501 | v5 | 21.44 |
| R10 | 22.919 | d10 = | 0.573 | | | | |
| R11 | 12.535 | d11 = | 0.565 | nd6 | 1.5843 | v6 | 28.25 |
| R12 | 4.376 | d12 = | 0.244 | | | | |
| R13 | 2.218 | d13 = | 0.774 | nd7 | 1.5510 | v7 | 45.00 |
| R14 | 5.963 | d14 = | 1.952 | | | | |
| R15 | −4.334 | d15 = | 0.550 | nd8 | 1.5450 | v8 | 55.81 |
| R16 | 16.912 | d16 = | 0.375 | | | | |
| R17 | ∞ | d17 = | 0.210 | ndg | 1.5168 | vg | 64.17 |
| R18 | ∞ | d18 = | 0.192 | | | | |

Table 6 shows aspheric surface data of respective lenses in the camera optical lens 20 according to Embodiment 2 of the present disclosure.

TABLE 6

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −5.3454E−01 | 4.6189E−04 | −4.5936E−04 | −9.0261E−05 | 3.1403E−04 | −2.8856E−04 | 1.3549E−04 | −3.7138E−05 | 5.6209E−06 | −3.6254E−07 |
| R2 | −1.5964E−02 | −2.2257E−03 | −1.4276E−03 | −4.2703E−05 | 9.9952E−04 | −1.0646E−03 | 5.6151E−04 | −1.6828E−04 | 2.7597E−05 | −1.9099E−06 |
| R3 | 1.0163E+01 | −1.6829E−02 | −6.5646E−03 | 3.8233E−03 | −2.4204E−04 | −7.7419E−04 | 4.4139E−04 | −1.1370E−04 | 1.5129E−05 | −8.7065E−07 |
| R4 | −7.8648E+01 | 1.9217E−02 | −3.6096E−02 | 2.6698E−02 | −1.1734E−02 | 3.1380E−03 | −5.1193E−04 | 5.9011E−05 | −6.4622E−06 | 4.5823E−07 |
| R5 | 1.1605E+01 | 1.2122E−03 | −1.3633E−02 | 6.9597E−03 | 1.1316E−03 | −3.2016E−03 | 1.6727E−03 | −4.3510E−04 | 5.9064E−05 | −3.3867E−06 |
| R6 | 5.2093E+00 | −3.3436E−03 | −4.1406E−03 | 4.3591E−03 | −2.5053E−03 | 9.1686E−04 | −2.3233E−04 | 4.0933E−05 | −4.3676E−06 | 1.9756E−07 |
| R7 | 2.9084E+01 | −2.8602E−03 | −3.8472E−03 | 4.3658E−03 | −2.2522E−03 | 6.1663E−04 | −6.7903E−05 | −5.1536E−06 | 1.9365E−06 | −1.3294E−07 |
| R8 | 3.1056E+00 | −7.1138E−04 | −2.0281E−03 | 2.0330E−03 | −1.0062E−03 | 2.7046E−04 | −3.3581E−05 | −1.5023E−07 | 4.4964E−07 | −3.1888E−08 |
| R9 | −1.1151E+03 | 5.3363E−03 | −1.4724E−02 | 7.4701E−03 | −2.5922E−03 | 6.3179E−04 | −1.1295E−04 | 1.4404E−05 | −1.1949E−06 | 4.7497E−08 |
| R10 | −1.3470E+02 | 9.7032E−03 | −1.8611E−02 | 9.3397E−03 | −3.4086E−03 | 9.1631E−04 | −1.7781E−04 | 2.3279E−05 | −1.8259E−06 | 6.4456E−08 |
| R11 | −5.6231E+01 | 1.1484E−02 | −3.7192E−03 | 8.6616E−04 | −2.0660E−04 | 3.8361E−05 | −5.1100E−06 | 4.4758E−07 | −2.2591E−08 | 4.8831E−10 |
| R12 | −3.1383E+01 | −1.9633E−02 | 7.8760E−03 | −1.9577E−03 | 3.1443E−04 | −3.5101E−05 | 2.6093E−06 | −1.1614E−07 | 2.4816E−09 | −1.1847E−11 |
| R13 | −6.1048E+00 | 6.4309E−03 | −2.5220E−03 | 2.3866E−04 | −2.2966E−05 | 2.4621E−06 | −2.0849E−07 | 1.0727E−08 | −2.9182E−10 | 3.5050E−12 |

TABLE 6-continued

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R14 | −5.9734E−01 | 1.4097E−02 | −5.3533E−03 | 7.6007E−04 | −7.4338E−05 | 5.3030E−06 | −2.7253E−07 | 9.5021E−09 | −1.9748E−10 | 1.8118E−12 |
| R15 | −7.1302E−01 | −4.7587E−03 | 1.2967E−04 | 3.6682E−05 | −1.1523E−06 | −1.2668E−07 | 1.1025E−08 | −3.7145E−10 | 6.0802E−12 | −4.0108E−14 |
| R16 | −7.2948E+01 | −5.4882E−03 | 1.1603E−04 | 1.4318E−05 | −2.7430E−06 | 2.6307E−07 | −1.4103E−08 | 4.1917E−10 | −6.4471E−12 | 4.0011E−14 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 |
|---|---|---|---|
| P1R1 | 1 | 1.935 | |
| P1R2 | 1 | 1.925 | |
| P2R1 | 1 | 0.755 | |
| P2R2 | 1 | 0.835 | |
| P3R1 | 1 | 1.805 | |
| P3R2 | 0 | | |
| P4R1 | 1 | 1.945 | |
| P4R2 | 1 | 2.165 | |
| P5R1 | 1 | 0.615 | |
| P5R2 | 2 | 0.725 | 2.505 |
| P6R1 | 1 | 1.695 | |
| P6R2 | 1 | 0.815 | |
| P7R1 | 2 | 1.455 | 3.775 |
| P7R2 | 1 | 1.705 | |
| P8R1 | 1 | 2.905 | |
| P8R2 | 2 | 0.855 | 4.905 |

TABLE 8

| | Number of arrest points | Arrest point position 1 |
|---|---|---|
| P1R1 | 0 | |
| P1R2 | 0 | |
| P2R1 | 1 | 1.355 |
| P2R2 | 1 | 1.875 |
| P3R1 | 0 | |
| P3R2 | 0 | |
| P4R1 | 0 | |
| P4R2 | 0 | |
| P5R1 | 1 | 0.965 |
| P5R2 | 1 | 1.125 |
| P6R1 | 1 | 2.445 |
| P6R2 | 1 | 2.225 |
| P7R1 | 1 | 2.535 |
| P7R2 | 1 | 2.765 |
| P8R1 | 0 | |
| P8R2 | 1 | 1.535 |

Figure 6:
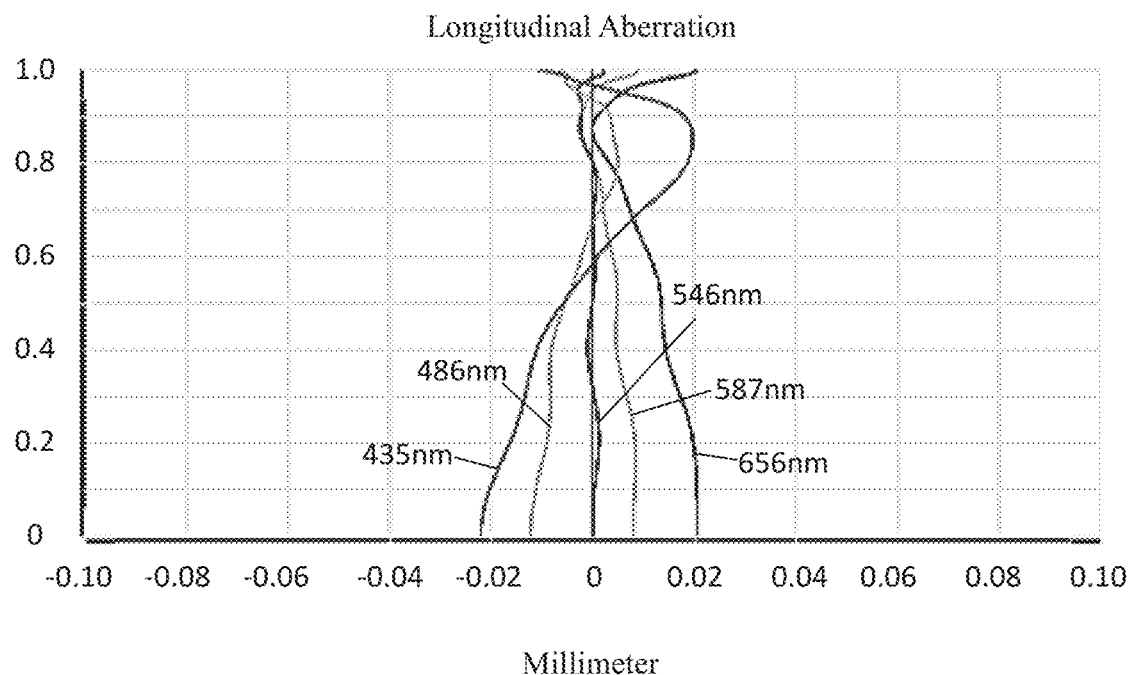
FIG. 6 is a schematic diagram of a longitudinal aberration of the camera optical lens shown in FIG. 5.
Figure 7:
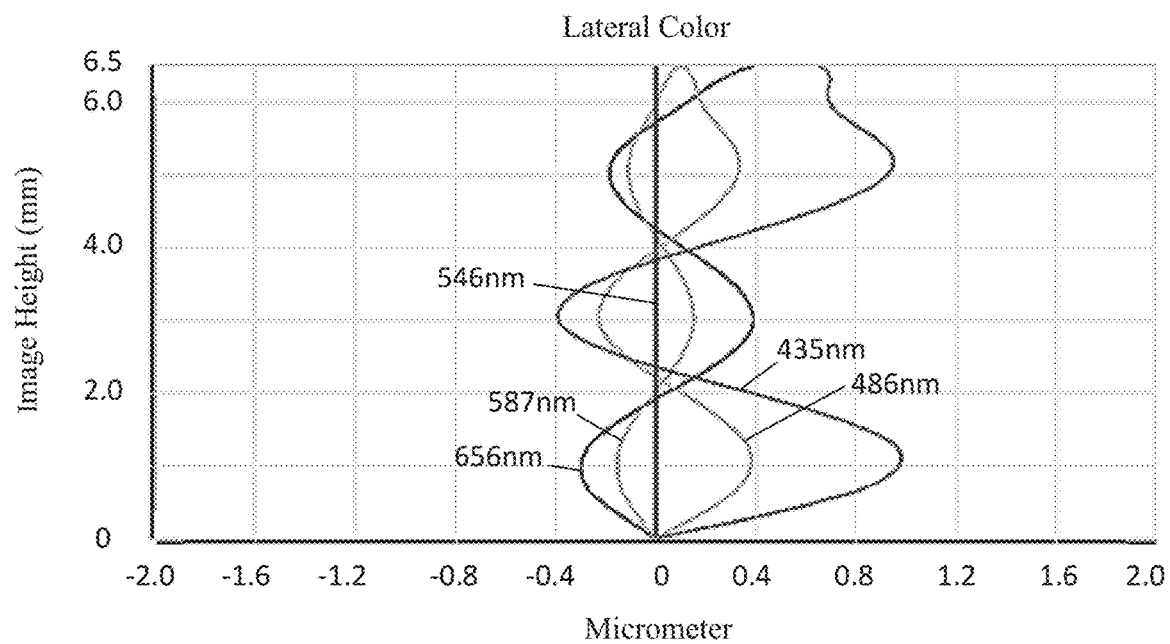
FIG. 7 is a schematic diagram of a lateral color of the camera optical lens shown in FIG. 5.
Figure 8:
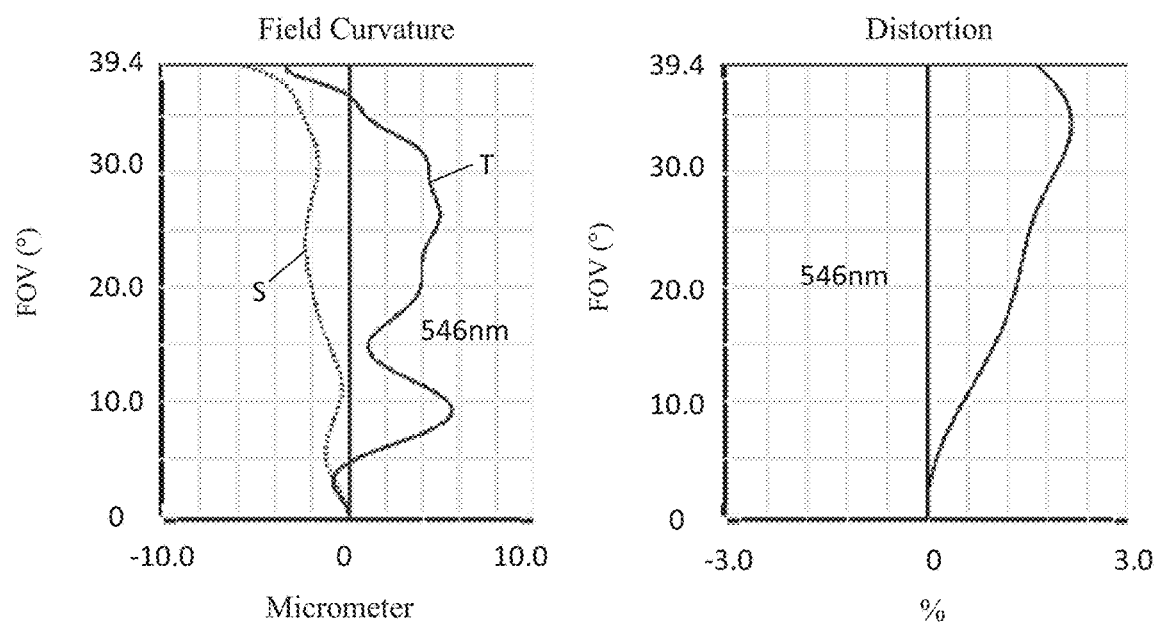
FIG. 8 is a schematic diagram of a field curvature and a distortion of the camera optical lens shown in FIG. 5.
Figure 9:
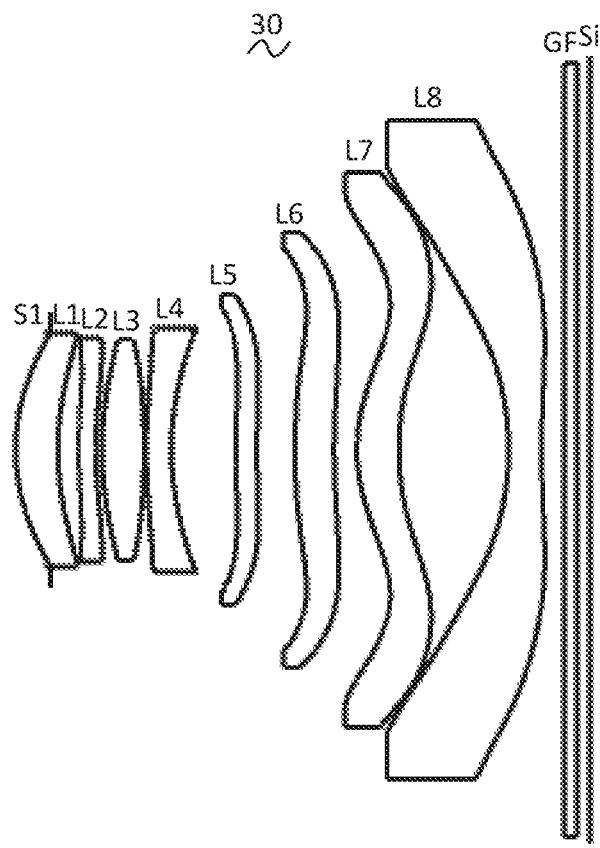
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 656 nm, 587 nm, 546 nm, 486 nm and 435 nm after passing the camera optical lens 20 according to Embodiment 2. FIG. 8 illustrates a field curvature and a distortion of light with a wavelength of 546 nm after passing the camera optical lens 20 according to Embodiment 2.

As shown in Table 13, Embodiment 2 satisfies respective conditions.

In this embodiment, the entrance pupil diameter of the camera optical lens is 3.997 mm. The image height of 1.0 H is 6.50 mm. The FOV (field of view) is 78.80°. Thus, the camera optical lens can achieve ultra-thin, wide-angle lenses while having on-axis and off-axis aberrations sufficiently corrected, thereby leading to better optical characteristics.

Embodiment 3

Embodiment 3 is basically the same as Embodiment 1 and involves symbols having the same meanings as Embodiment 1, and only differences therebetween will be described in the following.

Table 9 and Table 10 show design data of camera optical lens 30 in Embodiment 3 of the present disclosure.

TABLE 9

| | R | d | | nd | | vd |
|---|---|---|---|---|---|---|
| S1 | ∞ | d0 = | −0.580 | | | |
| R1 | 3.492 | d1 = | 0.695 | nd1 | 1.5450 | v1 55.81 |
| R2 | 4.933 | d2 = | 0.350 | | | |
| R3 | 8.611 | d3 = | 0.289 | nd2 | 1.6701 | v2 19.39 |
| R4 | 6.619 | d4 = | 0.106 | | | |
| R5 | 6.575 | d5 = | 0.696 | nd3 | 1.5661 | v3 37.71 |
| R6 | −9.250 | d6 = | 0.032 | | | |
| R7 | 11.765 | d7 = | 0.415 | nd4 | 1.6701 | v4 19.39 |
| R8 | 4.754 | d8 = | 1.079 | | | |
| R9 | 17.850 | d9 = | 0.346 | nd5 | 1.6153 | v5 25.94 |
| R10 | 18.365 | d10 = | 0.626 | | | |
| R11 | 12.606 | d11 = | 0.645 | nd6 | 1.5661 | v6 37.71 |
| R12 | 9.741 | d12 = | 0.376 | | | |
| R13 | 2.836 | d13 = | 0.703 | nd7 | 1.5450 | v7 55.81 |
| R14 | 5.048 | d14 = | 1.809 | | | |
| R15 | −4.832 | d15 = | 0.551 | nd8 | 1.5450 | v8 55.81 |
| R16 | 18.647 | d16 = | 0.375 | | | |
| R17 | ∞ | d17 = | 0.210 | ndg | 1.5168 | vg 64.17 |
| R18 | ∞ | d18 = | 0.219 | | | |

Table 10 shows aspheric surface data of respective lenses in the camera optical lens 30 according to Embodiment 3 of the present disclosure.

TABLE 10

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −1.0415E+00 | 2.1158E−03 | −5.5031E−04 | 6.5406E−04 | −6.7028E−04 | 4.0388E−04 | −1.4797E−04 | 3.1941E−05 | −3.6985E−06 | 1.7614E−07 |
| R2 | −6.7246E−01 | −1.9455E−03 | −3.3163E−05 | −1.7343E−03 | 1.4664E−03 | −7.1319E−04 | 2.0828E−04 | −3.3852E−05 | 2.7913E−06 | −9.0814E−08 |
| R3 | 3.5342E+00 | −1.6572E−02 | 5.0875E−03 | −1.4093E−02 | 1.5168E−02 | −9.3422E−03 | 3.5972E−03 | −8.4616E−04 | 1.1065E−04 | −6.1502E−06 |
| R4 | −5.3633E+01 | 8.6638E−03 | −3.2494E−03 | −1.3382E−02 | 1.5755E−02 | −9.1911E−03 | 3.3140E−03 | −7.4071E−04 | 9.3221E−05 | −5.0110E−06 |
| R5 | 6.2458E+00 | −2.2228E−03 | 7.9345E−03 | −1.3313E−02 | 9.4553E−03 | −3.9694E−03 | 1.0165E−03 | −1.4874E−04 | 9.8053E−06 | −6.5796E−08 |
| R6 | −3.2098E+01 | 1.8748E−02 | −2.3577E−02 | 1.5395E−02 | −7.0174E−03 | 2.1035E−03 | −3.9051E−04 | 4.4806E−05 | −3.8012E−06 | 2.3781E−07 |

TABLE 10-continued

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R7 | −3.0427E+01 | 1.4817E−02 | −1.9935E−02 | 1.2108E−02 | −5.0589E−03 | 1.4591E−03 | −2.5989E−04 | 2.4113E−05 | −7.3607E−07 | −1.7671E−08 |
| R8 | 6.0047E−01 | −8.3927E−03 | 2.4168E−03 | −1.7567E−03 | 9.4805E−04 | −2.9143E−04 | 5.5498E−05 | −6.6436E−06 | 4.6028E−07 | −1.3964E−08 |
| R9 | −4.9950E+02 | 4.9883E−03 | −1.0885E−02 | 5.2439E−03 | −1.8719E−03 | 5.0666E−04 | −1.0338E−04 | 1.4566E−05 | −1.2176E−06 | 4.4479E−08 |
| R10 | −2.4884E+02 | 2.8761E−03 | −8.0788E−03 | 2.4053E−03 | −3.8590E−04 | 1.8710E−05 | 3.5814E−06 | −5.9293E−07 | 3.2529E−08 | −6.2145E−10 |
| R11 | −1.4576E+01 | 7.3229E−03 | −1.1453E−03 | −5.5815E−04 | 2.5975E−04 | −5.6733E−05 | 7.0685E−06 | −5.0230E−07 | 1.8833E−08 | −2.8782E−10 |
| R12 | −4.3318E+01 | −1.2175E−02 | 5.4137E−03 | −1.7101E−03 | 3.4382E−04 | −4.7559E−05 | 4.3557E−06 | −2.4581E−07 | 7.6217E−09 | −9.8363E−11 |
| R13 | −6.8605E+00 | 1.5227E−02 | −6.3470E−03 | 1.2505E−03 | −2.2011E−04 | 2.7830E−05 | −2.1815E−06 | 1.0035E−07 | −2.4860E−09 | 2.5625E−11 |
| R14 | −1.0583E+00 | 1.1760E−02 | −4.4116E−03 | 4.5787E−04 | −2.2028E−05 | 1.8441E−06 | 3.7223E−08 | −2.2336E−09 | 5.7630E−11 | −5.8979E−13 |
| R15 | −1.2024E+00 | 2.9886E−03 | −3.1705E−03 | 7.7151E−04 | −8.7236E−05 | 5.4900E−06 | −2.0279E−07 | 4.3562E−09 | −5.0265E−11 | 2.4048E−13 |
| R16 | 6.5252E+00 | 4.3285E−05 | −1.7235E−03 | 2.6835E−04 | −2.0412E−05 | 8.9017E−07 | −2.3135E−08 | 3.5263E−10 | −2.9012E−12 | 9.9251E−15 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 0 | | | |
| P1R2 | 0 | | | |
| P2R1 | 1 | 0.765 | | |
| P2R2 | 1 | 0.905 | | |
| P3R1 | 1 | 1.685 | | |
| P3R2 | 0 | | | |
| P4R1 | 1 | 1.085 | | |
| P4R2 | 0 | | | |
| P5R1 | 1 | 0.715 | | |
| P5R2 | 1 | 0.735 | | |
| P6R1 | 1 | 1.605 | | |
| P6R2 | 1 | 1.075 | | |
| P7R1 | 2 | 1.485 | 3.785 | |
| P7R2 | 2 | 1.685 | 4.475 | |
| P8R1 | 2 | 3.955 | 4.585 | |
| P8R2 | 3 | 1.125 | 4.855 | 5.455 |

TABLE 12

| | Number of arrest points | Arrest point position 1 |
|---|---|---|
| P1R1 | 0 | |
| P1R2 | 0 | |
| P2R1 | 1 | 1.325 |
| P2R2 | 1 | 1.825 |
| P3R1 | 0 | |
| P3R2 | 0 | |
| P4R1 | 0 | |
| P4R2 | 0 | |
| P5R1 | 1 | 1.165 |
| P5R2 | 1 | 1.175 |
| P6R1 | 1 | 2.345 |
| P6R2 | 1 | 2.005 |
| P7R1 | 1 | 2.475 |
| P7R2 | 1 | 2.845 |
| P8R1 | 0 | |
| P8R2 | 1 | 1.825 |

Figure 10:
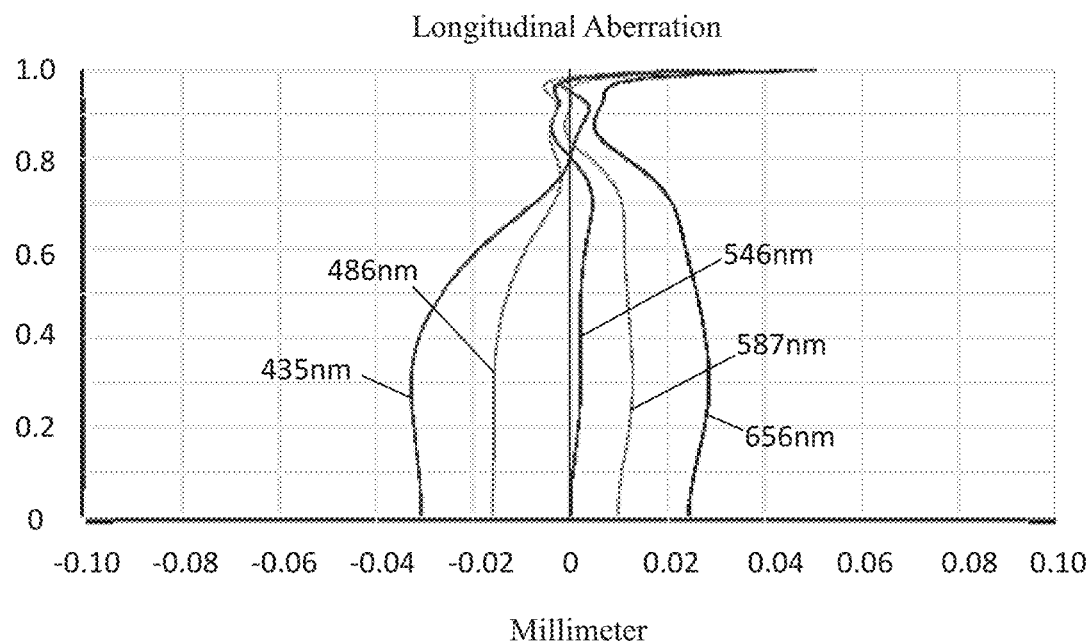
FIG. 10 is a schematic diagram of a longitudinal aberration of the camera optical lens shown in FIG. 9.
Figure 11:
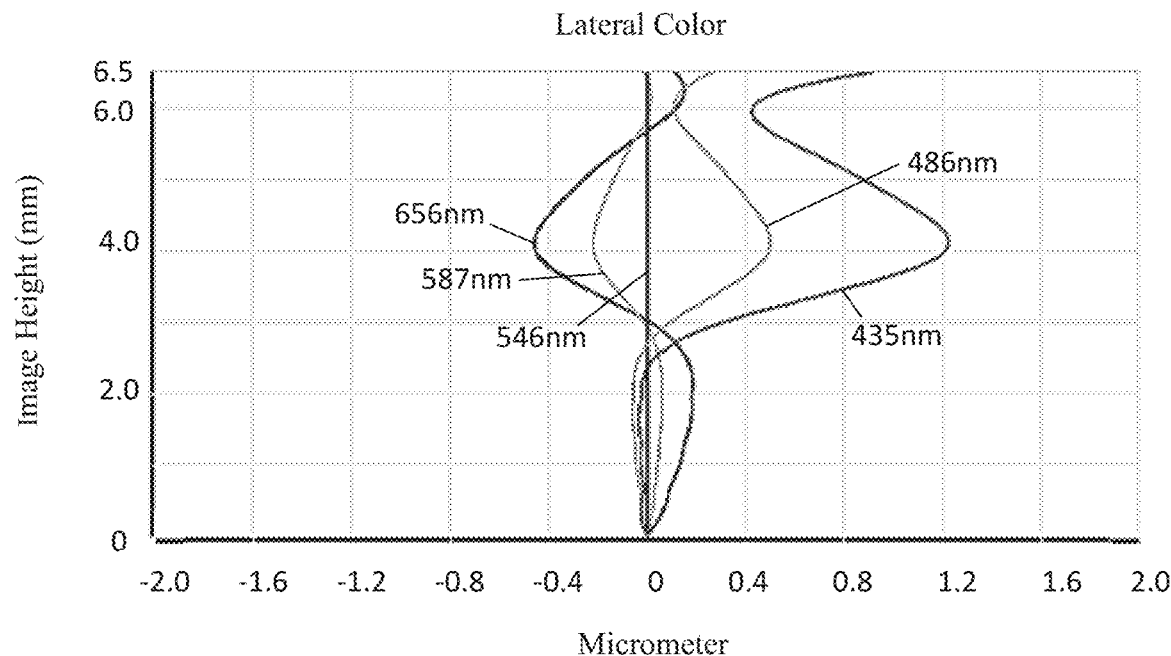
FIG. 11 is a schematic diagram of a lateral color of the camera optical lens shown in FIG. 9.
Figure 12:
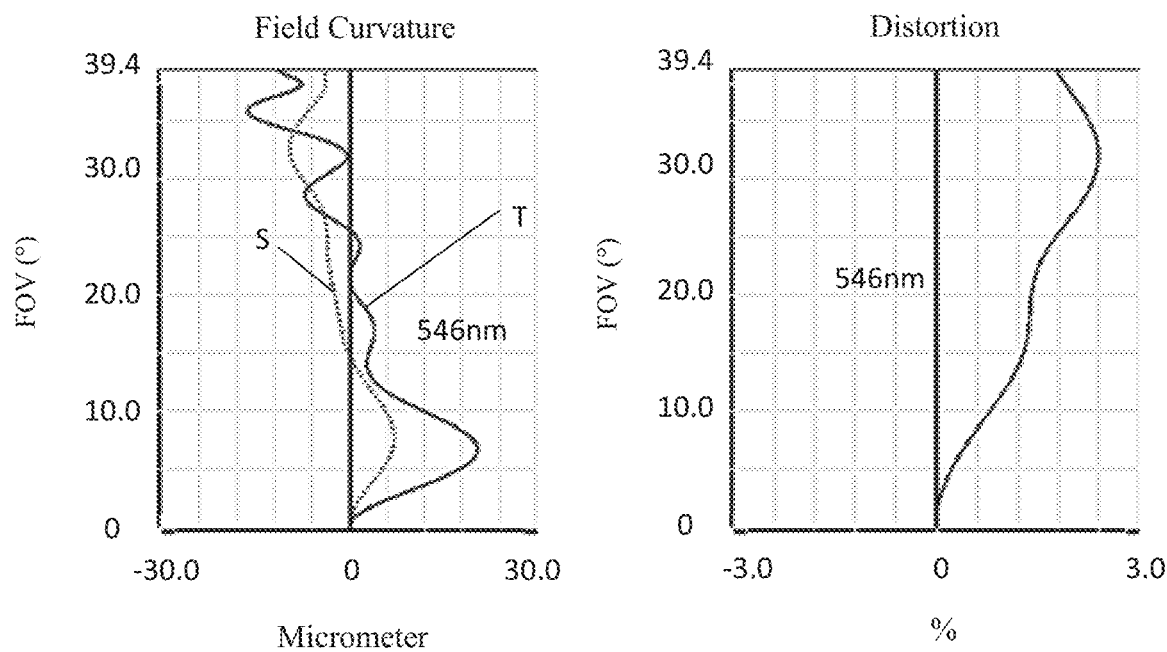
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 656 nm, 587 nm, 546 nm, 486 nm and 435 nm after passing the camera optical lens 30 according to Embodiment 3. FIG. 12 illustrates field curvature and distortion of light with a wavelength of 546 nm after passing the camera optical lens 30 according to Embodiment 3.

Table 13 below further lists various values of the present embodiment and values corresponding to parameters which are specified in the above conditions. Obviously, the camera optical lens according to this embodiment satisfies the above conditions.

In this embodiment, the entrance pupil diameter of the camera optical lens is 3.987 mm. The image height of 1.0H is 6.50 mm. The FOV (field of view) is 78.80°. Thus, the camera optical lens can achieve ultra-thin, wide-angle lenses while having on-axis and off-axis aberrations sufficiently corrected, thereby leading to better optical characteristics.

TABLE 13

| Parameters and Conditions | Embodiment 1 | Embodiment 2 | Embodiment 3 |
|---|---|---|---|
| f1/f | 1.90 | 2.91 | 2.40 |
| f2 | −14.70 | −98.41 | −44.82 |
| n3 | 1.67 | 1.55 | 1.57 |
| f | 7.404 | 7.794 | 7.775 |
| f1 | 7.404 | 7.794 | 7.775 |
| f3 | 4.843 | 7.333 | 6.856 |
| f4 | −5.394 | −14.856 | −12.051 |
| f5 | 10.305 | −178.612 | 815.428 |
| f6 | −26.867 | −11.708 | −81.933 |
| f7 | 12.237 | 5.940 | 10.625 |
| f8 | −6.670 | −6.246 | −6.954 |
| f12 | 107.31 | 28.242 | 29.227 |
| Fno | 1.95 | 1.95 | 1.95 |

Fno denotes an F number of the camera optical lens.

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:
1. A camera optical lens, comprising, from an object side to an image side:
a first lens;
a second lens;
a third lens;
a fourth lens;
a fifth lens;
a sixth lens;
a seventh lens; and
an eighth lens,
wherein the camera optical lens satisfies following conditions:
$1.90 \leq f1/f \leq 3.00$;
$f2 \leq 0.00$; and
$1.55 \leq n3 \leq 1.70$,
$5.00 \leq d5/d6 \leq 22.00$, where
f denotes a focal length of the camera optical lens;
f1 denotes a focal length of the first lens;
f2 denotes a focal length of the second lens; and
n3 denotes a refractive index of the third lens;
d5 denotes an on-axis thickness of the third lens; and
d6 denotes an on-axis distance from an image side surface of the third lens to an object side surface of the fourth lens.

2. The camera optical lens as described in claim 1, further satisfying a following condition:

$-7.00 \leq (R13+R14)/(R13-R14) \leq -2.00$, where
R13 denotes a curvature radius of an object side surface of the seventh lens; and
R14 denotes a curvature radius of an image side surface of the seventh lens.

3. The camera optical lens as described in claim 1, further satisfying following conditions:

$-15.47 \leq (R1+R2)/(R1-R2) \leq -2.06$; and
$0.03 \leq d1/TTL \leq 0.11$, where
R1 denotes a curvature radius of an object side surface of the first lens;
R2 denotes a curvature radius of an image side surface of the first lens;
d1 denotes an on-axis thickness of the first lens; and
TTL denotes a total optical length from the object side surface of the first lens to an image plane of the camera optical lens along an optic axis.

4. The camera optical lens as described in claim 1, further satisfying following conditions:

$-25.25 \leq f2/f \leq -1.32$;
$1.37 \leq (R3+R4)/(R3-R4) \leq 23.22$; and
$0.02 \leq d3/TTL \leq 0.05$, where
R3 denotes a curvature radius of an object side surface of the second lens;
R4 denotes a curvature radius of an image side surface of the second lens;
d3 denotes an on-axis thickness of the second lens; and
TTL denotes a total optical length from an object side surface of the first lens to an image plane of the camera optical lens along an optic axis.

5. The camera optical lens as described in claim 1, further satisfying following conditions:

$0.33 \leq f3/f \leq 1.41$;
$-0.53 \leq (R5+R6)/(R5-R6) \leq -0.05$; and
$0.03 \leq d5/TTL \leq 0.13$, where
f3 denotes a focal length of the third lens;
R5 denotes a curvature radius of an object side surface of the third lens;
R6 denotes a curvature radius of an image side surface of the third lens;
d5 denotes an on-axis thickness of the third lens; and
TTL denotes a total optical length from an object side surface of the first lens to an image plane of the camera optical lens along an optic axis.

6. The camera optical lens as described in claim 1, further satisfying following conditions:

$-3.81 \leq f4/f \leq -0.49$;
$0.32 \leq (R7+R8)/(R7-R8) \leq 3.53$; and
$0.02 \leq d7/TTL \leq 0.07$, where
f4 denotes a focal length of the fourth lens;
R7 denotes a curvature radius of an object side surface of the fourth lens;
R8 denotes a curvature radius of an image side surface of the fourth lens;
d7 denotes an on-axis thickness of the fourth lens; and
TTL denotes a total optical length from an object side surface of the first lens to an image plane of the camera optical lens along an optic axis.

7. The camera optical lens as described in claim 1, further satisfying following conditions:

$-45.83 \leq f5/f \leq 157.32$;
$-140.64 \leq (R9+R10)/(R9-R10) \leq 13.50$; and
$0.02 \leq d9/TTL \leq 0.13$, where
f5 denotes a focal length of the fifth lens;
R9 denotes a curvature radius of an object side surface of the fifth lens;
R10 denotes a curvature radius of an image side surface of the fifth lens;
d9 denotes an on-axis thickness of the fifth lens; and
TTL denotes a total optical length from an object side surface of the first lens to an image plane of the camera optical lens along an optic axis.

8. The camera optical lens as described in claim 1, further satisfying following conditions:

$-21.08 \leq f6/f \leq -1.00$; and
$1.04 \leq (R11+R12)/(R11-R12) \leq 11.70$; and
$0.03 \leq d11/TTL \leq 0.10$, where
f6 denotes a focal length of the sixth lens;
R11 denotes a curvature radius of an object side surface of the sixth lens;
R12 denotes a curvature radius of an image side surface of the sixth lens;
d11 denotes an on-axis thickness of the sixth lens; and
TTL denotes a total optical length from an object side surface of the first lens to an image plane of the camera optical lens along an optic axis.

9. The camera optical lens as described in claim 1, further satisfying following conditions:

$0.38 \leq f7/f \leq 2.48$; and
$0.03 \leq d13/TTL \leq 0.12$, where
f7 denotes a focal length of the seventh lens;
d13 denotes an on-axis thickness of the seventh lens; and
TTL denotes a total optical length from an object side surface of the first lens to an image plane of the camera optical lens along an optic axis.

* * * * *